United States Patent
Beck et al.

(10) Patent No.: US 9,769,977 B2
(45) Date of Patent: *Sep. 26, 2017

(54) PRESSURE CONTROL SYSTEM AND METHOD FOR AN AGRICULTURAL PLANTER

(71) Applicant: CNH Industrial America LLC, New Holland, PA (US)

(72) Inventors: Michael M. Beck, Theresa, WI (US); Jerry L. Brinkley, Woodbridge, IL (US); Jonathan L. Buelow, Houston, TX (US); Darwin L. Steffensen, Racine, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,400

(22) Filed: Jun. 6, 2016

(65) Prior Publication Data

US 2016/0278281 A1 Sep. 29, 2016

Related U.S. Application Data

(62) Division of application No. 14/076,688, filed on Nov. 11, 2013, now Pat. No. 9,357,689.

(51) Int. Cl.
*A01B 59/00* (2006.01)
*A01C 5/06* (2006.01)
(Continued)

(52) U.S. Cl.
CPC .............. *A01C 7/102* (2013.01); *A01B 59/00* (2013.01); *A01C 5/064* (2013.01); *A01C 5/068* (2013.01);
(Continued)

(58) Field of Classification Search
CPC ......... A01B 59/00; A01C 5/064; A01C 5/062; A01C 5/06; A01C 5/00; A01C 5/068;
(Continued)

(56) References Cited

U.S. PATENT DOCUMENTS 2,967,485 A  1/1961 Towler et al.
3,855,953 A  12/1974 Fathauer et al.
(Continued)

FOREIGN PATENT DOCUMENTS

CN  203327616 U  11/2013
GB  1463808 A  2/1977
(Continued)

OTHER PUBLICATIONS

McKenzie, Dan W., Alsobrok, Alan; "Evaluation of the Two-Row Timberland Hodag Tree-Planting Machine," United States Department of Agriculture; Jun. 1984.
(Continued)

*Primary Examiner* — Christopher J Novosad
(74) *Attorney, Agent, or Firm* — Rebecca L. Henkel; Rickard K. DeMille

(57) ABSTRACT

A planter system includes a planter having an unloading valve and a controller. The unloading valve is fluidly coupled between an inlet and an outlet of a pump. The unloading valve is configured to receive a fluid at a supply pressure, to supply a first portion of the fluid from the inlet to a hydraulic planter system at an unloading pressure less than the supply pressure, and to recirculate a remainder of the fluid to the pump via the outlet. The controller is communicatively coupled to the unloading valve and to the pump. The controller is configured to control the pressure of the fluid supplied to the inlet and to control the unloading pressure of the first portion supplied to the hydraulic planter system.

20 Claims, 4 Drawing Sheets

(51) Int. Cl.
*A01C 7/08* (2006.01)
*A01C 15/00* (2006.01)
*A01C 7/10* (2006.01)
*A01C 21/00* (2006.01)

(52) U.S. Cl.
CPC ................ *A01C 7/08* (2013.01); *A01C 21/00* (2013.01); *A01C 7/081* (2013.01); *A01C 15/00* (2013.01)

(58) Field of Classification Search
CPC .. A01C 5/066; A01C 7/08; A01C 7/00; A01C 21/00; A01C 7/102; A01C 7/10; A01C 7/081; A01C 15/00
See application file for complete search history.

(56) References Cited

U.S. PATENT DOCUMENTS

| | | | |
|---|---|---|---|
| 4,141,283 A | 2/1979 | Swanson et al. | |
| 4,744,285 A | 5/1988 | Presley | |
| 5,615,553 A | 4/1997 | Lourigan | |
| 7,798,079 B2 | 9/2010 | Memory et al. | |
| 7,873,456 B2 | 1/2011 | Erdmann et al. | |
| 8,075,668 B2 | 12/2011 | Delmotte et al. | |
| 9,357,689 B2 * | 6/2016 | Beck | A01B 59/00 |
| 2005/0022705 A1 | 2/2005 | Copeland | |
| 2009/0142201 A1 | 6/2009 | Lin et al. | |
| 2010/0205953 A1 | 8/2010 | Bettin et al. | |

FOREIGN PATENT DOCUMENTS

| | | |
|---|---|---|
| JP | S5690105 A | 7/1981 |
| JP | S5837303 A | 3/1983 |

OTHER PUBLICATIONS

"Pump Unloading Valves," Elwood Fuild Power; Jun. 2007.
Bhatia, A.; "Fluid Power (Part 2)—Hydraulic Power Units," Continuing Education and Development, Inc; Jul. 1990.

* cited by examiner

PRESSURE CONTROL SYSTEM AND METHOD FOR AN AGRICULTURAL PLANTER

CROSS-REFERENCE TO RELATED APPLICATION

This application is a divisional of U.S. patent application Ser. No. 14/076,688, entitled "PRESSURE CONTROL SYSTEM AND METHOD FOR AN AGRICULTURAL PLANTER", filed Nov. 11, 2013, which is herein incorporated by reference in its entirety.

BACKGROUND

The present invention relates generally to agricultural implements, and more particularly to a pressure control system and method for a planter or similar implement designed to be towed behind a work vehicle.

A wide range of agricultural implements are known, are presently in use, and are particularly designed for towing behind a work vehicle, such as a tractor. In one family of such implements, which includes tillers, planters, and so forth, a wide swath of ground is tilled, planted, or otherwise worked via one or more passes of the implement. Planting implements typically include multiple row units distributed across a width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a packer wheel that packs the soil on top of the deposited seeds.

Certain planting implements include seed tanks and distribution systems to convey seeds from the tank to each row unit. Distribution systems of the planting implement may be driven via hydraulic systems, such as seed drives and fan drives. The work vehicle may supply hydraulic fluid to the hydraulic systems of the planting implement to operate the distribution systems. Unfortunately, an oversupply of hydraulic fluid to the distribution systems may generate excess heat in the work vehicle. Additionally, an oversupply of hydraulic fluid may reduce control resolution and/or stability of the distribution systems.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a planter system includes an inlet, a control valve assembly, an unloading valve, and an outlet. The inlet is configured to receive a fluid at a supply pressure. The control valve assembly includes a hydraulic motor and one or more control valves. The hydraulic motor is configured to control dispensing of an agricultural material at a desired rate. The one or more control valves of the control valve assembly are configured to receive a first portion of the fluid and are configured to distribute the first portion of the fluid to the hydraulic motor at a demand pressure less than the supply pressure. The unloading valve is fluidly coupled to the inlet and to the one or more control valves of the control valve assembly. The unloading valve is configured to separate the fluid from the inlet into the first portion and a remainder based at least in part on the desired rate, to direct the first portion of the fluid to the one or more control valves of the control valve assembly at an unloading pressure less than the supply pressure and greater than the demand pressure, and to receive the first portion of the fluid after flowing through the hydraulic motor. The unloading valve is also configured to direct the remainder of the fluid to an outlet to bypass the one or more control valves of the control valve assembly. The outlet is configured to receive the first portion of the fluid after the control valve receives the first portion of the fluid, and the outlet is configured to receive the remainder of the fluid from the unloading valve.

In another embodiment, a planter system includes a planter having an unloading valve and a controller. The unloading valve is fluidly coupled between an inlet and an outlet of a pump. The unloading valve is configured to receive a fluid at a supply pressure, to supply a first portion of the fluid from the inlet to a hydraulic planter system at an unloading pressure less than the supply pressure, and to recirculate a remainder of the fluid to the pump via the outlet. The controller is communicatively coupled to the unloading valve and to the pump. The controller is configured to control the pressure of the fluid supplied to the inlet and to control the unloading pressure of the first portion supplied to the hydraulic planter system.

In a further embodiment, method of operating a planter system includes determining a demand pressure of a hydraulic fluid to drive one or more hydraulic planter systems based at least in part on a desired rate of distribution of an agricultural material, controlling a supply pressure of the hydraulic fluid from a pump to be greater than the demand pressure, and adjusting an unloading valve fluidly disposed between the pump and the one or more hydraulic planter systems. The unloading valve is adjusted to provide a first portion of the hydraulic fluid to the one or more hydraulic planter systems at an unloading pressure greater than or equal to the demand pressure, and the unloading valve is adjusted to direct a remainder of the hydraulic fluid back to the pump. The desired rate of distribution is received via an input signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
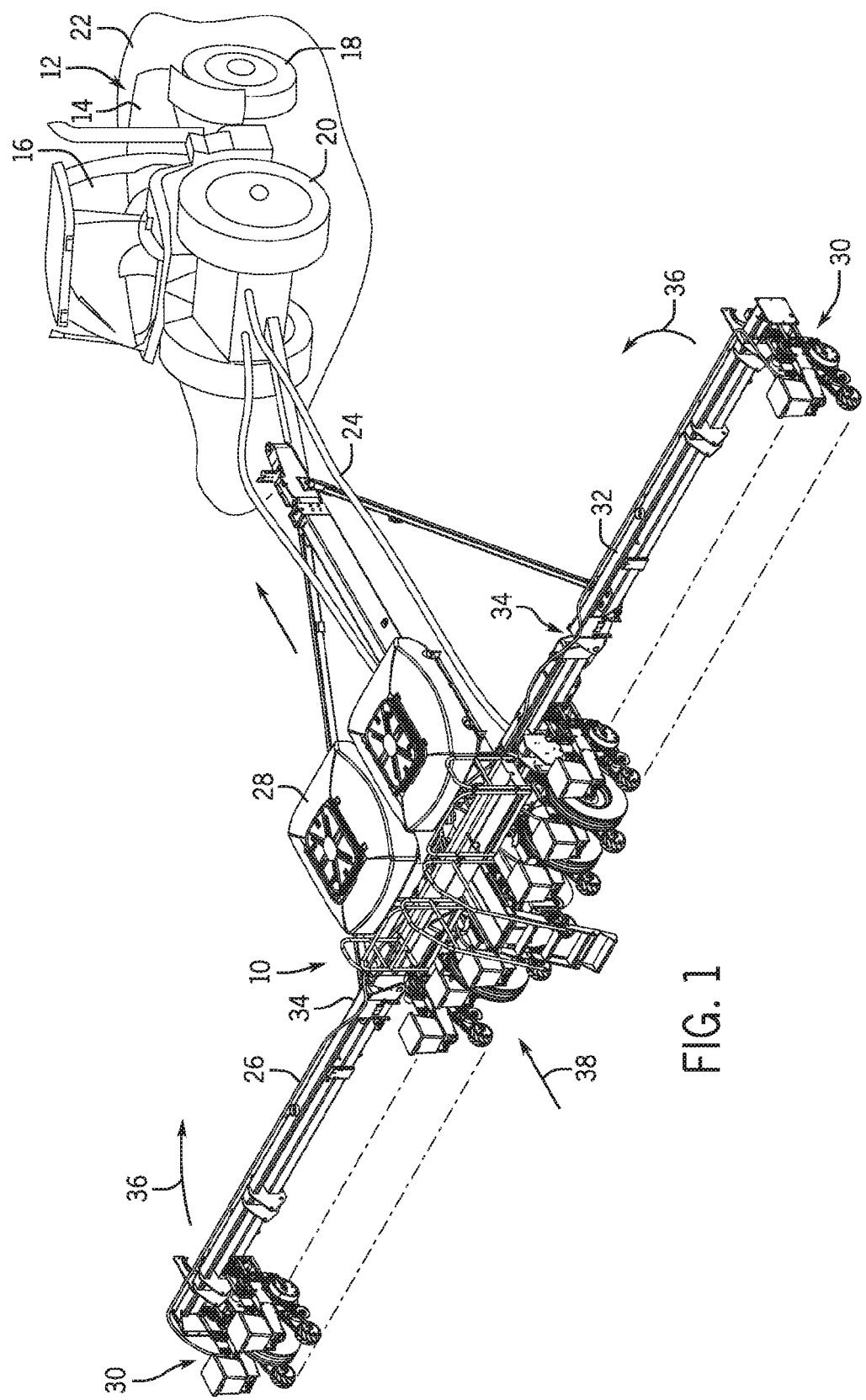
FIG. 1 is a perspective view of an embodiment of an agricultural implement configured to deposit seeds into a soil surface, with the agricultural implement coupled to a work vehicle.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the pressure control system described herein facilitate control of an unloading valve between a hydraulic pump in a work vehicle and planter hydraulics within an agricultural implement. The hydraulic pump of the work vehicle directs hydraulic fluid to the planter hydraulics to facilitate dispensing agricultural materials (e.g., seed, fertilizer) from the agricultural implement. The planter hydraulics distribute agricultural materials at a desired rate based on a demand flow rate and/or a demand pressure of hydraulic fluid through respective hydraulic components. The unloading valve receives the hydraulic fluid from the hydraulic pump, distributes a first portion of the hydraulic fluid at substantially the demand flow rate and/or the demand pressure to the planter hydraulics, and directs a remainder, if any, of the hydraulic fluid back to the hydraulic pump. Each hydraulic component of the planter hydraulics may have a respective control valve that adjusts the first portion of the hydraulic fluid to the demand flow rate and/or the demand pressure. The unloading valve reduces the maximum pressure of the first portion of the hydraulic fluid that is received by the control valves, thereby increasing the efficiency of the control valves and the respective hydraulic components by decreasing energy losses (e.g., in the form of heat generation, vibration) from adjusting the hydraulic fluid flow. Accordingly, the unloading valve may reduce the wear on the control valves and the respective hydraulic components. The unloading valve may reduce the pressure drop across hydraulic components (e.g., control valves, hydraulic motors), thereby enabling a controller to control the control valves with more precision than if the hydraulic fluid is supplied directly from the hydraulic pump to the control valves. The controller may adjust the hydraulic pump to control the supply of hydraulic fluid to the unloading valve, and the controller may adjust the unloading valve to control the separation of the hydraulic fluid into the first portion and the remainder. In some embodiments, the unloading valve may dampen fluctuations in the flow of hydraulic fluid from the tractor hydraulics to the planter hydraulics.

Turning now to the drawings, FIG. 1 is a perspective view of an embodiment of an agricultural implement 10 and a work vehicle 12. The illustrated work vehicle 12 has a body 14 that houses an engine, transmission (e.g., gear box), cooling system, and power train. The work vehicle 12 has a cabin 16 where an operator may sit or stand to operate the vehicle 12. The work vehicle 12 has two front wheels 18 and two rear wheels 20 that rotate to move the work vehicle 12 along the ground 22 at a ground speed. In some embodiments, the work vehicle 12 may have tracks rather than one or both sets of wheels 18, 20.

The agricultural implement 10 (e.g., planter) may be towed behind the work vehicle 12 across the ground 22, as shown in FIG. 1. The work vehicle 12 may supply a working fluid (e.g., hydraulic fluid, air, water) to the agricultural implement via one or more fluid lines 24. One or more motors (e.g., hydraulic motors) may receive the working fluid from the work vehicle 12 and drive systems of the agricultural implement 10. For example, one or more hydraulic motors may drive a fan and/or seed drive to direct agricultural material (e.g., seeds, fertilizer) along supply lines 26 from tanks 28 to multiple row units 30 distributed along a frame assembly 32. Each row unit 30 is configured to deposit seeds at a desired depth beneath the soil surface, thereby establishing rows of planted seeds. While only some row units 30 are shown for clarity in the embodiment of FIG. 1, various other embodiments of the agricultural implement 10 may include 6, 8, 12, 16, 24, 32, or 36 row units, or more. In addition, the spacing between row units 30 may be particularly selected based on a type of crop being planted. For example, the row units 30 may be spaced approximately 30 inches from one another for planting corn, and approximately 15 inches from one another for planting soybeans.

The agricultural implement 10 may have a variety of systems driven by the working fluid (e.g., hydraulic fluid) supplied by the work vehicle 12. Motors of the agricultural implement may control the rate of delivery of the agricultural product and/or a vacuum pressure within the tanks 28 or supply lines. In some embodiments, the frame assembly 32 of the agricultural implement 10 may be adjustable to fold into a transport configuration (e.g., via rotation of wings about joints 34) as shown by arrows 36 and/or to pivot and align the frame assembly 32 with a direction of travel 38.

Figure 2:
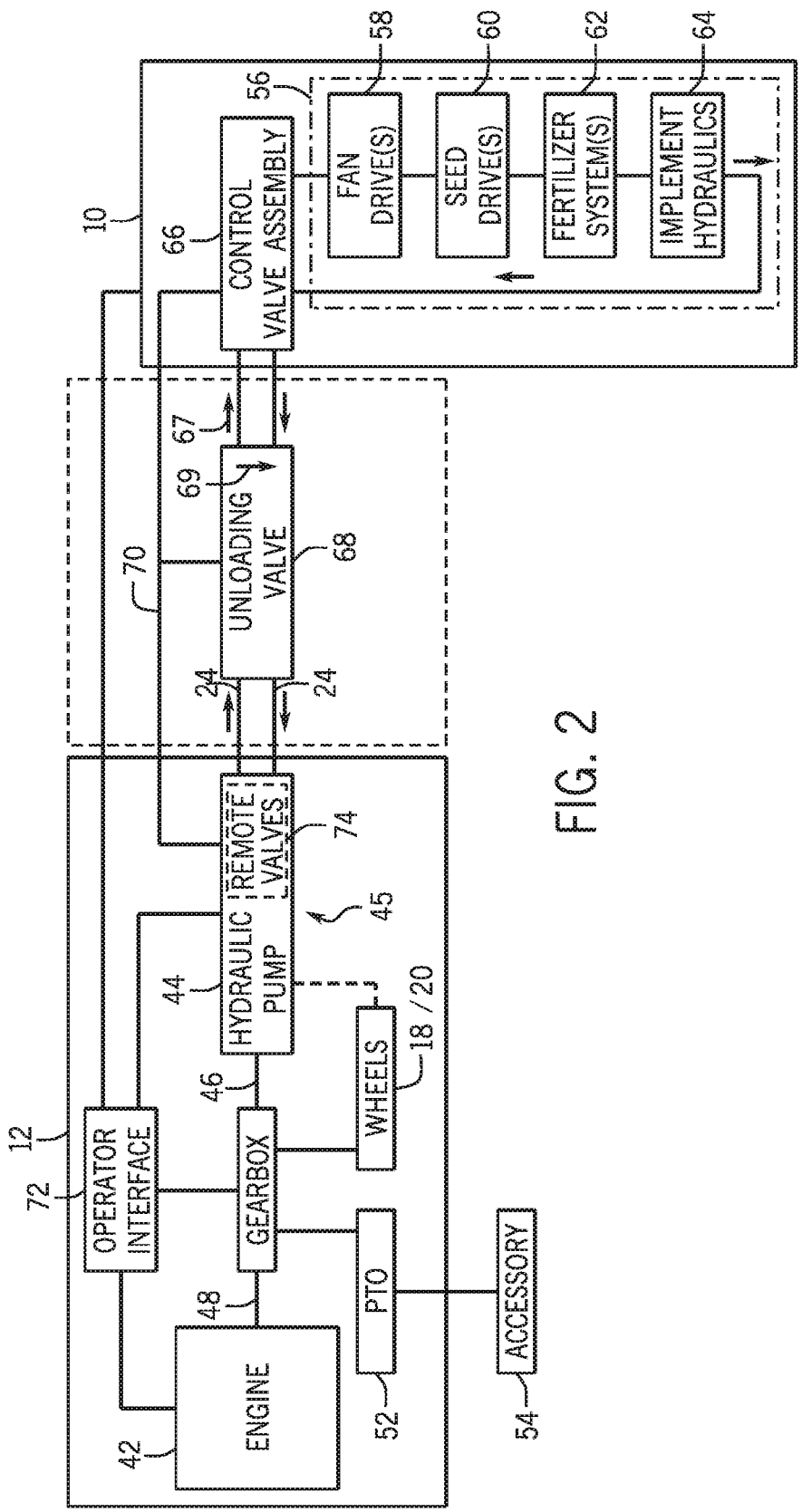
FIG. 2 is a schematic diagram of an embodiment of hydraulic systems that may be employed within the work vehicle and the agricultural implement of FIG. 1.

FIG. 2 is a schematic diagram of an embodiment of hydraulic systems within the work vehicle 12 and the agricultural implement (e.g., planter) 10 of FIG. 1. An engine 42 of the work vehicle 12 drives a hydraulic pump 44, (e.g., which is part of tractor hydraulics 45) via a drive shaft 46. In some embodiments, the engine 42 drives the hydraulic pump 44 via a belt drive or gearbox 48. The engine 42 may drive wheels 18 and/or 20 of the work vehicle 12 via the gearbox 48 or hydraulic pump 44. As illustrated, a power take-off shaft 52 (PTO) or generator of the work vehicle 12 transfers power from the engine 42 to an accessory 54 coupled to the work vehicle 12. Accessories 54 may include a conveyor, a cabin system, and so forth.

Planter hydraulics 56 are driven by hydraulic fluid pumped from the hydraulic pump 44 of the tractor hydraulics 45 of the work vehicle 12. As may be appreciated, driving the planter hydraulics 56 using the hydraulic pump 44 of the work vehicle 12 may improve operational flexibility by enabling the agricultural implement 10 to operate with only a hydraulic output from a work vehicle 12. Moreover, driving the planter hydraulics 56 using the hydraulic pump 44 of the work vehicle 12 may improve efficiency of transferring power from the work vehicle 12 to the agricultural implement 10 by reducing conversion steps from mechanical power to hydraulic power. In some embodiments, the planter hydraulics 56 may include, but are not limited to, one or more fan drives 58, one or more seed drives 60, one or more fertilizer systems 62, implement hydraulics 64, or any combination thereof. A fan drive 58 may direct agricultural material (e.g., seed) from the tank 28 toward the row units 30, and the seed drive 60 may distribute the agricultural material at a desired rate and position onto the ground 22. The fertilizer system 62 may distribute a solid or liquid fertilizer onto the ground 22 proximate to the distributed seed. As discussed herein, the term agricultural material may include, but is not limited to, seed and fertilizer. The implement hydraulics 64 may actuate the frame assembly 32 into various positions for storage, transport, and/or operation.

While the embodiment of FIG. 2 includes four components of the planter hydraulics 56, some embodiments of the agricultural implement 10 may include more or fewer than four components of the planter hydraulic 56, in any suitable combination. Additionally, some embodiments may have multiple planter hydraulic components of the same type. For example, the planter hydraulics 56 may have a single fan drive 58, a single fan drive 58 with one seed drive 60 and a fertilizer system 62, a single fan drive 58 with two seed drives 60 and a fertilizer system 62, a single seed drive 60, or multiple seed drives 60.

A control valve assembly 66 controls the distribution of the hydraulic fluid from the work vehicle 12 to the planter hydraulics 56. As illustrated, components of the planter hydraulics 56 serially receive the hydraulic fluid, thereby enabling each component of the planter hydraulics 56 to receive the same flow of the hydraulic fluid. In other embodiments, components of the planter hydraulics 56 receive the hydraulic fluid in parallel, thereby enabling each component of the planter hydraulics 56 to receive the hydraulic fluid at substantially the same pressure.

An unloading valve 68 controls the distribution (e.g., pressure) of a first portion of the hydraulic fluid from the hydraulic pump 44 (e.g., part of the tractor hydraulics 45) to the planter hydraulics 56 via the control valve assembly 66. The unloading valve 68 separates the hydraulic fluid into a first portion 67, which is supplied to the planter hydraulics 56, and a remainder 69, which is returned to the hydraulic pump 44. The unloading valve 68 may be a part of the agricultural implement 10 or the work vehicle 12. By diverting the remainder 69 of the hydraulic fluid back to the hydraulic pump 44, the unloading valve 68 enables the first portion 67 of the fluid received by the planter hydraulics 56 to be at a lower pressure than the hydraulic fluid received at the unloading valve 68. In some embodiments, the control valve assembly 66 may be communicatively coupled via a signal line 70 (e.g., electrical line, pilot hydraulic line) to the unloading valve 68 and/or to the hydraulic pump 44. For example, the unloading valve 68 may receive the hydraulic fluid at a first pressure (e.g., 1000 psi), and the control valve assembly 66 may be controlled to distribute the first portion 67 of the hydraulic fluid to the planter hydraulics 56 at a second pressure (e.g., 500 psi). The control valve assembly 66 may communicate with the unloading valve 68 and/or the hydraulic pump 44 via the signal line 70 to reduce the pressure of the first portion 67 of the hydraulic fluid supplied by the unloading valve 68. As discussed below, the unloading valve 68 may adjust the pressure of the first portion 67 of the fluid flow by adjusting a ratio between the first portion 67 and the remainder 69, and the hydraulic pump 44 may adjust the pressure of the first portion 67 by adjusting the pressure of the hydraulic fluid supplied to the unloading valve 68.

An operator interface 72 may control the operation of the work vehicle 12 and the agricultural implement 10. The operator interface 72 may include a controller communicatively coupled to systems of the work vehicle 12 and the agricultural implement 10. The operator interface 72 may receive inputs to control the engine 42 and the gearbox 48 to control a speed of the work vehicle 12 and/or to control the power supplied to the hydraulic pump 44. Furthermore, the operator interface 72 may receive inputs to facilitate direct control of the hydraulic pump 44. The operator interface 72 may be used to adjust the first pressure of the hydraulic fluid supplied by the hydraulic pump 44. The hydraulic pump 44 may supply the hydraulic fluid used by the planter hydraulics 56 and used by other systems (e.g., wheels 50), which may operate at higher pressures than the planter hydraulics 56. Accordingly, the unloading valve 68 enables the planter hydraulics 56 to operate at a lower pressure than the other systems driven by the hydraulic pump 44. In some embodiments, the tractor hydraulics 45 may have remote valves 74, enabling the operator to control a quantity of the hydraulic fluid each system receives from the operator interface 72.

Figure 3:
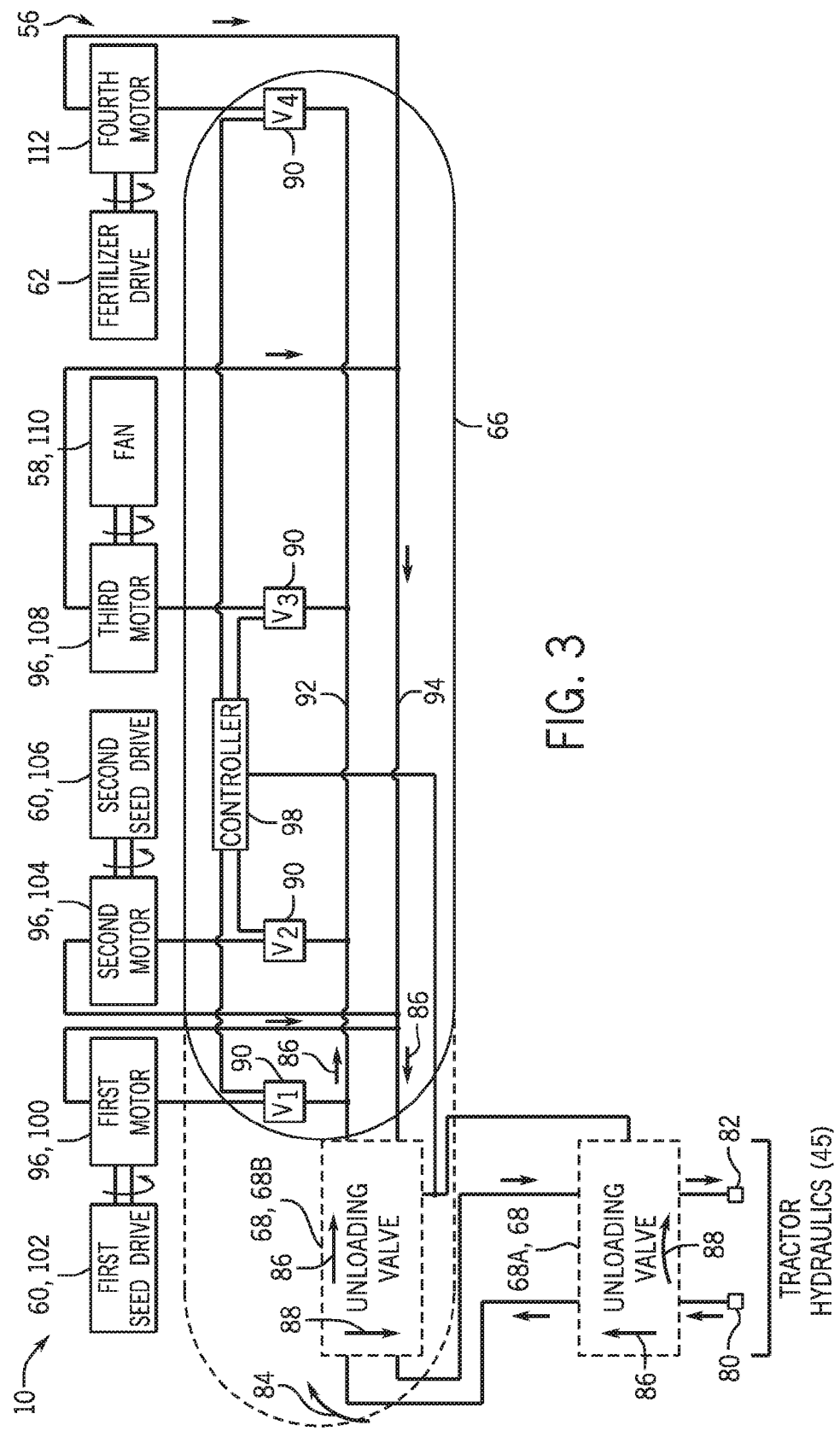
FIG. 3 is a schematic diagram of an embodiment of a hydraulic circuit that may be employed within the agricultural implement of FIG. 2.

FIG. 3 is a schematic diagram of an embodiment of a hydraulic circuit that may be employed within the agricultural implement 10. The hydraulic pump 44 provides hydraulic fluid to the agricultural implement 10 through an inlet 80, and receives the hydraulic fluid through an outlet 82. The unloading valve 68, illustrated as either 68A or 68B, is fluidly coupled between the inlet 80 and the outlet 82, and located upstream of the planter hydraulics 56 and the control valve assembly 66 relative to a direction 84 of the hydraulic fluid from the inlet 80. In some embodiments, the unloading valve 68 (e.g., unloading valve 68A) is arranged separately from the control valve assembly 66. In other embodiments, the unloading valve 68 (e.g., unloading valve 68B) is arranged as part of the control valve assembly as shown by the dashed portion of the control valve assembly 66.

In either arrangement, the unloading valve 68 receives the hydraulic fluid at a first pressure from the inlet 80, and separates the hydraulic fluid into a first portion 86 that is directed to one or more control valves 90 of the control valve assembly 66, and a remainder 88 that is recirculated back to the outlet 82. The remainder 88 does not pass through the one or more control valves 90 of the control valve assembly 66 or the planter hydraulics 56. The unloading valve 68 directs the remainder 88 and the first portion 86, which has passed through the control valve assembly 66 or the planter hydraulics 56, to the outlet 82. The unloading valve 68 reduces the pressure of the first portion 86 from the first pressure to a second pressure, and reduces the pressure of the remainder 88 from the first pressure to a third pressure. As may be appreciated, the third pressure is less than the second pressure due to compensation for losses through the one or more control valves 90 of the control valve assembly 66 and the planter hydraulics 56. In some embodiments, the unloading valve 68 may be a bleed valve that is manually and/or automatically adjustable to control respective pressure drops of the first portion 86 and the remainder 88.

The control valve assembly 66 distributes the first portion 86 of the hydraulic fluid to the planter hydraulics 56 via the one or more control valves 90. As may be appreciated, the components of the planter hydraulics 56 may be in a parallel flow arrangement, and may each be coupled to a supply line 92 and a drain line 94, as shown. The one or more control valves 90 of the control valve assembly 66 may subdivide the first portion 86 of the hydraulic fluid from the supply line 92 to power each of the components of the planter hydraulics 56. The pressure of the first portion 86 along the supply line 92 may be substantially equal to the second pressure at each of the control valves 90, and the pressure of the first portion 86 along the drain line 94 after passing through the components of the planter hydraulics 56 may be substantially equal to the third pressure.

As discussed above, the planter hydraulics 56 may include one or more seed drives 60, one or more fan drives 58, one or more fertilizer drives 62, or any combination thereof. Each component of the planter hydraulics 56 may be driven by a respective motor 96 (e.g., hydraulically driven motor). In some embodiments, the motors 96 may be driven at different speeds and/or driven to transfer different amounts of power to the components of the planter hydraulics 56. The one or more control valves 90 control the pressure of the hydraulic fluid to the respective motors 96, thereby controlling the distribution of the agricultural material. In some embodiments, the control valves 90 are solenoid operated proportional flow control valves controlled by a controller 98. The controller 98 may receive input signals from the operator interface 72 to facilitate control of the pressure of the hydraulic fluid through the one or more control valves 90. For example, the controller 98 may control the control valves 90 to drive a first motor 100 at a first speed (e.g., 200 rpm) for a first seed drive 102, a second motor 104 at a second speed (e.g., 150 rpm) for a second seed drive 106, and a third motor 108 at a third speed (e.g., 400 rpm) for a fan 110. In some embodiments, the controller 98 may control the control valves 90 to drive a fourth motor 112 at a fourth speed (e.g., 300 rpm) for a fertilizer drive 62 to distribute fertilizer (e.g., solid or liquid) to a field.

The controller 98 controls the one or more control valves 90 to distribute the agricultural material at a desired rate that may be selected at, or input into, the operator interface 72. For example, a minimum pressure and a minimum flow rate of the first portion 86 of the hydraulic fluid sufficient to satisfy the desired rates may correspond to a desired demand level of the first portion 86. The hydraulic pump 44 supplies the hydraulic fluid to the unloading valve 68 at a supply level that corresponds to a first pressure. When the hydraulic fluid is supplied to the unloading valve 68 at a supply level greater than the demand level, the controller 98 may adjust the unloading valve 68 to separate the first portion 86 at an unloading level that is approximately greater than or equal to demand level. Moreover, the unloading level corresponds to the second pressure that is greater than the minimum pressure. The remainder 88 of the hydraulic fluid is recirculated from the unloading valve 68 to the hydraulic pump 44, bypassing the one or more control valves 90 of the control valve assembly 66 and the motors 96.

The controller 98 may control the hydraulic pump 44 to reduce the supply level to be substantially equal to the demand level, thereby reducing the quantity and pressure of the remainder 88 that bypasses the planter hydraulics 56 and reducing the pressure drop between the first pressure and the second pressure of the first portion 86. The controller 98 may control the supply level so that a ratio of the first portion 86 to the remainder 88 is approximately 1. Reducing the supply level to be substantially the same as the demand level may reduce the heat generated by the pump and/or improve the efficiency of the work vehicle 12 and agricultural implement 10. Operator inputs via the operator interface 72 may adjust (e.g., increase, decrease) the one or more desired rates, thereby adjusting (e.g., increasing) the demand level. The controller 98 may increase the supply level of the hydraulic fluid from the hydraulic pump 44 to satisfy the increased demand level. Conversely, the controller 98 may decrease the supply level of the hydraulic fluid from the hydraulic pump 44 to satisfy the decreased demand level, thereby decreasing the remainder 88 of the hydraulic fluid diverted by the unloading valve 68.

Providing the first portion 86 of the hydraulic fluid at the unloading level to the one or more control valves 90 of the control valve assembly 66 may improve operations of the agricultural implement 10. For example, the unloading valve 68 may supply the first portion 86 at a more consistent pressure than the hydraulic pump 44, thereby reducing the number of compensation adjustments to the one or more control valves 90. In some embodiments, the response time of the unloading valve 68 to adjust the unloading level may be faster than the response time to adjust the supply level from the hydraulic pump 44. For example, the unloading valve 68 may have a response time of approximately less than 0.5, 1, or 3 seconds, and the hydraulic pump 44 may have a response time of less than approximately 3, 4, or 5 seconds. Moreover, the unloading valve 68 may control the pressure of the hydraulic fluid supplied to the one or more control valves 90 when the hydraulic pump 44 may not be adjusted for any reason (e.g., another system driven by the hydraulic pump 44 operates with a higher pressure of the hydraulic fluid than the planter hydraulics 56).

Moreover, because the unloading level is substantially equal to the demand level, the one or more control valves 90 may be more efficient in transferring the hydraulic energy to the motors 96 than if the one or more control valves 90 adjusted the hydraulic flow at the first pressure directly from the hydraulic pump 44. That is, the unloading valve 68 may reduce the pressure drop across each of the one or more control valves 90. A smaller pressure drop across the one or more control valves 90 may enable the controller 98 to control the one or more control valves 90 with more precision than if the hydraulic fluid is supplied directly from the hydraulic pump 44 at the first pressure. For example, if the controller 98 may adjust the pressure drop through a control valve 90 with a resolution of approximately 10 percent, a pressure drop of 1000 psi may be controlled within approximately 100 psi, whereas a pressure drop of 100 psi may be controlled within approximately 10 psi. Accordingly, the smaller pressure drop across the one or more control valves 90 may improve control of the one or more desired rates and may improve operational stability of the planter hydraulics 56. The first pressure of the hydraulic fluid to the unloading valve 68 may vary with the engine speed and/or power applied to the hydraulic pump 44. The controller 98 may enable control of the unloading valve 68 to supply the first portion 86 to the one or more control valves 90 of the control valve assembly 66 with a substantially uniform unloading pressure. A substantially uniform unloading pressure may be within approximately 5 to 10 percent of the demand pressure.

The unloading valve 68 may provide several benefits to the control and operation of the planter hydraulics 56. The unloading valve 68 may decrease the pressure drop across the one or more control valves 90 of the control valve assembly 66, thereby increasing the control resolution of the control valves 90. Increasing the control resolution of the control valves 90 may enable the controller 98 to make fine tuning adjustments to the operation of the planter hydraulics 56. For example, the increased control resolution may enable the controller 98 to adjust operation of the first seed drive 102 within approximately 5 percent or less of a desired speed, rather than within approximately 10 percent of the desired speed. By reducing the pressure drop across the one or more control valves 90, the unloading valve 68 may reduce heat generation in the control valves 90. As may be appreciated, reduced heat generation may decrease wear and/or increase the usable life of the one or more control valves 90. In some embodiments, the unloading valve 68 increases the stability and/or reduces fluctuations in supply of hydraulic fluid to planter hydraulics 56 from the tractor hydraulics 45. By diverting hydraulic fluid as the remainder 88 that is in excess of the demand rate, the unloading valve 68 may reduce the effects of increasing surges in the hydraulic fluid from the tractor hydraulics 45.

Figure 4:
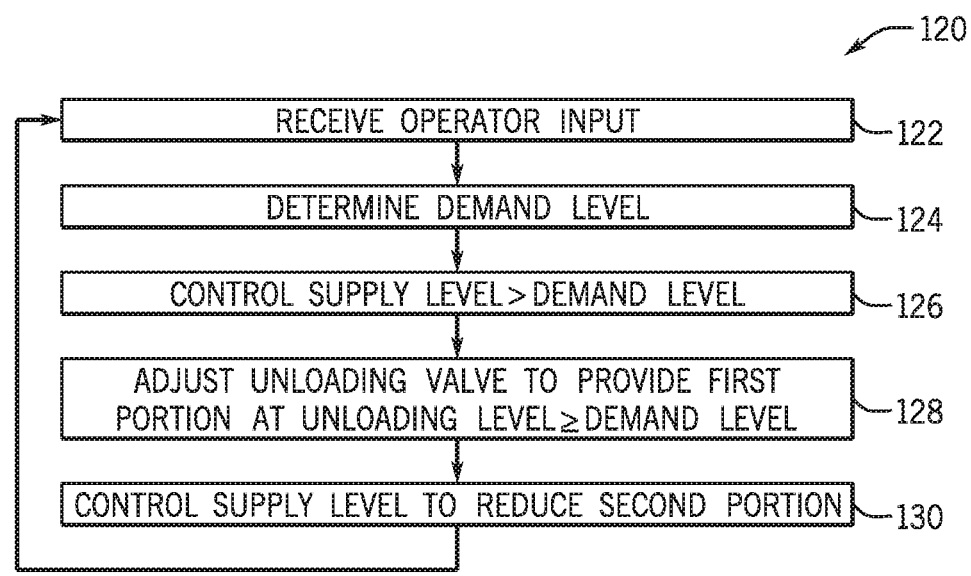
FIG. 4 is a flow diagram of an embodiment of a method of operating a planter system using an unloading valve.

FIG. 4 is a flow diagram of an embodiment of a method 120 of operating a planter system using the unloading valve 68 described above. The controller (e.g., controller 98) receives operator input for distributing agricultural material via an operator interface (e.g., operator interface 72) (block 122). The operator input may be one or more desired values for the planter hydraulics (e.g., planter hydraulics 56), such as a desired seed planting rate or density, a desired vacuum pressure within a tank, a desired fan speed, a desired fertilizer flow rate, and so forth. The controller determines a demand level (e.g., pressure) for the hydraulic fluid to power the planter hydraulics (e.g., motors) at the one or more desired rates (block 124). Upon determining the demand level, the controller controls the pump (e.g., hydraulic pump 44) to supply the hydraulic fluid at a supply level that is greater than the demand level in order to provide sufficient hydraulic fluid to the planter hydraulics (block 126). The controller adjusts an unloading valve (e.g., unloading valve 68) to provide a first portion (e.g., first portion 86) of the hydraulic fluid to the planter hydraulics at an unloading level that is greater than the demand level (block 128). The unloading valve separates the hydraulic fluid into the first portion with a first pressure sufficient to drive the planter hydraulics at the one or more desired rates, and into the remainder (e.g., remainder 88) that bypasses the planter hydraulics. The controller also controls the pump to reduce the supply level and reduce the remainder that bypasses the planter hydraulics (block 130). Reducing the supply level to approximately the demand level may improve the efficiency of the work vehicle and the planter (e.g., agricultural implement 10). In some embodiments, the controller repeats the method 120 to adjust the system as desired for subsequently received operator inputs (block 122).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a planter system, comprising:
   determining a demand pressure of a hydraulic fluid to drive at least one hydraulically driven component based at least in part on a target rate of distribution of an agricultural material, wherein the target rate of distribution is received via an input signal;
   controlling a supply pressure of the hydraulic fluid from a pump to be greater than or substantially equal to the demand pressure; and
   controlling an unloading valve fluidly disposed between the pump and the at least one hydraulically driven component to provide a first portion of the hydraulic fluid to the at least one hydraulically driven component at an unloading pressure greater than or equal to the demand pressure, and to direct a remainder of the hydraulic fluid back to the pump.

2. The method of claim 1, wherein the at least one hydraulically driven component comprises a plurality of hydraulically driven components.

3. The method of claim 2, comprising controlling a plurality of control valves to distribute the first portion of the hydraulic fluid among the plurality of hydraulically driven components.

4. The method of claim 1, wherein controlling the unloading valve is based at least in part on the demand pressure of the hydraulic fluid at the at least one hydraulically driven component.

5. The method of claim 1, wherein controlling the unloading valve comprises adjusting the unloading pressure of the hydraulic fluid to be substantially equal to the demand pressure within a first response time.

6. The method of claim 5, comprising controlling the pump to adjust the supply pressure of the hydraulic fluid to be substantially equal to the demand pressure within a second response time, wherein the first response time is less than the second response time.

7. The method of claim 1, wherein the input signal comprises an electrical signal, a hydraulic signal, or any combination thereof.

8. The method of claim 1, wherein the input signal is received from a user interface.

9. A method of operating a planter system, comprising:
   controlling a pump to control a supply pressure of a fluid at an inlet to an unloading valve, wherein the unloading valve is fluidly coupled to the pump via the inlet, the unloading valve is configured to supply a first portion of the fluid from the inlet to at least one hydraulically driven component of the planter system at an unloading pressure less than or substantially equal to the supply pressure, and the unloading valve is configured to recirculate a remainder of the fluid to the pump via an outlet of the unloading valve; and
   controlling the unloading valve to control the unloading pressure of the first portion of the fluid supplied to the at least one hydraulically driven component of the planter system.

10. The method of claim 9, wherein the at least one hydraulically driven component comprises a plurality of hydraulically driven components.

11. The method of claim 10, comprising controlling a plurality of control valves to distribute the first portion of the fluid among the plurality of hydraulically driven components.

12. The method of claim 9, comprising determining a demand pressure of the fluid supplied to the at least one hydraulically driven component.

13. The method of claim 12, wherein controlling the pump comprises controlling the supply pressure to be substantially equal to the demand pressure within a first response time.

14. The method of claim 13, wherein controlling the unloading valve comprises controlling the unloading pressure to be substantially equal to the demand pressure within a second response time, and wherein the second response time is less than the first response time.

15. The method of claim 12, wherein controlling the unloading valve is based at least in part on the demand pressure of the fluid at the at least one hydraulically driven component.

16. A method of operating a planter system, comprising:
   determining a demand pressure of a hydraulic fluid to drive at least one hydraulically driven component based at least in part on a target rate of distribution of an agricultural material, wherein the target rate of distribution is received via an input signal; and controlling an unloading valve fluidly disposed between a pump and the at least one hydraulically driven component to provide a first portion of the hydraulic fluid to the at least one hydraulically driven component at an unloading pressure greater than or equal to the demand pressure, and to direct a remainder of the hydraulic fluid back to the pump.

17. The method of claim 16, wherein controlling the unloading valve is based at least in part on the demand pressure of the hydraulic fluid at the at least one hydraulically driven component.

18. The method of claim 16, wherein the input signal comprises an electrical signal, a hydraulic signal, or any combination thereof.

19. The method of claim 16, wherein the at least one hydraulically driven component comprises a plurality of hydraulically driven components.

20. The method of claim 19, comprising controlling a plurality of control valves to distribute the first portion of the hydraulic fluid among the plurality of hydraulically driven components.

\* \* \* \* \*